US009480947B2

(12) United States Patent
Salu et al.

(10) Patent No.: US 9,480,947 B2
(45) Date of Patent: Nov. 1, 2016

(54) VARIABLE CAPACITY MULTIPLE-LEG PACKED SEPARATION COLUMN

(71) Applicant: Saudi Arabian Oil Company, Dhahran (SA)

(72) Inventors: Samusideen Adewale Salu, Ras Tanura (SA); Talal A. Zahrani, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 158 days.

(21) Appl. No.: 14/288,820

(22) Filed: May 28, 2014

(65) Prior Publication Data
US 2015/0343370 A1    Dec. 3, 2015

Related U.S. Application Data

(60) Provisional application No. 61/842,040, filed on Jul. 2, 2013.

(51) Int. Cl.
*B01D 53/14* (2006.01)
*B01D 53/26* (2006.01)

(52) U.S. Cl.
CPC ..... *B01D 53/263* (2013.01); *B01D 2252/2023* (2013.01); *B01D 2252/20489* (2013.01); *B01D 2252/504* (2013.01); *B01D 2257/80* (2013.01)

(58) Field of Classification Search
CPC .............. B01D 2252/2023; B01D 2252/204; B01D 2252/504; B01D 53/1412; B01D 53/1493
See application file for complete search history.

(56) References Cited

U.S. PATENT DOCUMENTS
3,377,812 A    4/1968    Garrett et al.

FOREIGN PATENT DOCUMENTS
FR    WO 2013064755 A1 *    5/2013    ......... B01D 53/1462

OTHER PUBLICATIONS

Machine Translation WO 2013064755 accessed Feb. 22, 2016.*
International Search Report and Written Opinion in related International Application PCT/2014/039733 mailed Oct. 14, 2014.

* cited by examiner

*Primary Examiner* — Duane Smith
*Assistant Examiner* — Cabrena Holecek
(74) *Attorney, Agent, or Firm* — Abelman, Frayne & Schwab

(57) ABSTRACT

An industrial packed column for gas stream processing to remove a component by liquid absorbent contact includes:
  a. a plurality of packed tubular members having ends aligned in vertical parallel array to form a first bundle,
  b. an upper lean absorption liquid inlet and lower rich absorption liquid outlet;
  c. a raw gas feed inlet positioned below the packing material, connected to a raw feed gas manifold via control valves for selectively admitting the feed gas to one or more of the plurality of tubular members,
  d. an upper treated gas outlet, connected via valved conduit to (i) a treated gas collection manifold and (ii) the raw gas inlet of one or more of the other tubular members, and
the apparatus equipped with appropriate systems so that desired portions of the treated gas stream exiting a tubular member can be passed for further treatment to at least one other tubular member in the first bundle.

9 Claims, 9 Drawing Sheets

VARIABLE CAPACITY MULTIPLE-LEG PACKED SEPARATION COLUMN

BACKGROUND OF THE INVENTION

1. Field of the Invention

The present invention relates to the construction and operation of packed columns used in separation processes such as absorption, stripping and distillation.

2. Description of Related Art

Packed columns are utilized as unit operations for performing separation processes such as absorption, stripping and distillation where there is a need to achieve mass transfer between gas and liquid phases. For example, in the absorption process, the packed column typically is used to remove a component from a gas stream by contact with a liquid sorbent.

In the oil and gas, and chemical processing industries, the separation process is often carried out to meet a predetermined product specification. One widely used application of the packed column is the removal of water from a gaseous hydrocarbon stream in conjunction with a gas-oil separation plant, or GOSP. During the production life of a well, the mix of crude oil and hydrocarbon gases produced to the surface and entering the transmission pipeline from the well head contains a variable proportion of water which can be in liquid and vapor form. It is important that the gas stream leaving the GOSP contains no more than a predetermined amount of water in order to avoid the corrosion of downstream piping, fittings, instrumentation and the like. The concentration of water is measured in pounds per million standard cubic feet (MMSCF).

As used herein, the terms "water load specification" or "specification" means the predetermined weight of water, e.g., pounds/MMSCF, of the treated wet gas leaving the wet gas separation unit operation.

The design of a water separation unit operation for a GOSP can be complex. A typical separator is provided with a stationary packing matter over which a liquid absorbent passes counter-currently with the upwardly moving wet gas from which water is removed. One commonly used sorbent is triethylene glycol (TEG), which will be referenced in the description that follows. Other absorbents include ethylene glycol, methyl ethylene glycol and methyldiethanolamine As will be understood by one of ordinary skill in the art, the operating capacity and parameters of the numerous components employed in processing the feed streams must be taken into account and all are part of the initial design specification. As will also be apparent, any significant upstream changes will effect the downstream operations.

A typical separation unit operation of the prior art is illustrated in its essential simplified form in the schematic diagram of FIG. 1, the operation of which can be described as follows:

a. the high pressure wet gas (210) enters the inlet of the gas-liquid knock-out separator (100) for partial water and condensate removal (212);

b. the gas from the gas-liquid knock-out separator (214) enters the TEG contactor separation column (110) from the bottom of the column while the regenerated 99% pure lean TEG (256) enters from the top of the counter-current flow absorption process;

c. the dried treated gas (215) flows from the top of the packed contractor separation column (110) through a shell and tube exchanger (132) to further cool the lean TEG stream entering the contactor (110);

d. the rich TEG (216) is transferred to the regeneration system, where it is heated through the still condenser (120) before entering, via line 220, the flash drum (140) that is set at, e.g., 55 psig for flashing the hydrocarbons;

e. still condenser (120) also produces a vapor stream (218) that is removed from the system;

f. flash drum (140) produces a rich TEG stream (224) and a side stream (222);

g. the rich TEG (224) passes through multiple stages of filtration in the filter system (142A, 142B), the filter TEG stream (226) passes through purifier (144) and the purified stream (228) can pass to optional charcoal filter (146) and discharge stream (232) or as by-pass stream (230), after which the essentially pure stream (234) is heated by the lean TEG by passage through the rich/lean TEG heat exchanger (150);

h. the heated rich TEG (236) enters the TEG still (122) and into the reboiler (124) that is set at 392° F. from the TEG still for water removal;

i. a side stream of stripping gas (260) is fed to the reboiler (124) through the stripping column (125) to enhance the purity of the TEG stream (250) by lowering the partial pressure of the water;

j. the hot regenerated lean TEG (250) is collected in the accumulator vessel (126) and the recycle stream (252) passes through booster pump (128) to the rich/lean TEG heat exchanger (150); and k. the cooled lean TEG stream (254) is pumped by the circulation pump (130) and the stream (255) is further cooled by the dry gas (215) passed through the heat exchanger (132) before the cooled stream (256) enters the contactor (110) at a pressure of about 393 psig. The warmer dry gas (216) is recovered from the separator unit for continued transmission.

As is well known in the art, the capability of a packed column to achieve the desired predetermined specification for the treated gas stream is based upon the design parameters of the unit, including specifically its volumetric capacity, as well as the type of absorbent liquid used and the packing materials placed in the column. The configurations of the packing materials are selected to assure maximum contact and exchange between the liquid-bearing gas and the liquid sorbent. The design parameters for separation units are established and well-known in the art and the characteristics of the packing materials are published by their manufacturers to facilitate the design phase.

Common applications of packed columns in the oil and gas industry include contacting wet natural gas with triethylene glycol (TEG) liquid to dehydrate, or partially dry the gas to meet a required specification, and the sweetening of natural gas by removing sulfur compounds using methyldiethanolamine (MDEA) in counter-current flow over the packing material in the column.

A packed column is typically a cylindrical, vertically oriented vessel that includes a packed section that is filled with a specified packing material, of which there are many types. The packing can be placed randomly, as with Raschig rings, or the section can be filled with a specially designed structured packing material. The goal is to achieve the most effective contact between the two phases at a prescribed flow rate in order to achieve an efficient separation, while at the same time minimizing the size of the column and the corresponding volume of packing materials and sorbent in order to minimize the capital costs of construction and the continuing operational costs. As noted above, the size of the packed column, e.g., its diameter and height, are determined in view of the flow rate of the gas stream being treated, the initial load of the material that is to be removed by contact with the sorbent and the specification or maximum acceptable loading of the treated gas stream.

The features of a typical packed column (10) of the prior art will be described in more detail, with reference to FIG. 2. The pressure vessel includes upper portion (12), central portion (14) and lower end portion (16). The packed section (20) is filled with a packing material or materials which have been predetermined to provide the optimum contact conditions between the sorbent liquid and the material to be removed from the gas stream. The fresh or lean liquid sorbent (31) is maintained in a storage vessel (not shown) and is introduced via a liquid feed inlet (30) to the liquid distributor (32), which can include, as shown, a manifold with a series of disbursing nozzles (34) or, alternatively, a perforated tray (not shown) that distributes the sorbent liquid over the cross-sectional area of the packed section (20). Following its downflow over the packing material (22) and absorption of the compound(s) to be removed from the gas stream, the rich sorbent liquid (41) is retained by hold-up tray (40) and passes through a liquid outlet (42) to a sorbent regeneration unit (not shown), after which lean sorbent is returned to the sorbent storage vessel.

The gas stream (51) to be treated enters the column (10) via gas inlet (50) and is distributed through the lower cross-sectional area by gas inlet distribution device (52), which can be in the form of a manifold having a plurality of perforations (54) through which the gas (51) is emitted to provide a uniform upward flow. Any liquid present in the incoming gas stream is collected as condensate (58) in the bottom portion (16) of the column and can be discharged from the column (10) via valved condensate outlet (18). The bottom portion (16) of the column serves as an integrated gas-liquid knock-out separator that partially removes water and liquid condensates from the inlet gas stream.

The gas entering inlet (50) passes through gas chimney (44) which channels the gas stream directly into the packed section of the column without permitting it to travel through the accumulated liquid in the hold-up tray (40).

After passing in intimate contact with the sorbent liquid in the packed section (20), the treated gas accumulates in the upper gas disengagement section (36) in the top portion (12) of the column (10). The treated gas stream (37) is discharged through the gas outlet (38). The gas disengagement phase enables any liquid carried out in the gas stream to separate and return to be mixed with the incoming sorbent liquid feed (31).

A significant variable that must be taken into account in the design of the packed column is the anticipated load of water that is being carried in the gas stream to be treated. For example, as noted above, in the earliest stages of production from a new well, the water load may be relatively low. As hydrocarbon production continues, the well may have to be subjected to water injection in order to promote the flow from the surrounding reservoir rock into the wellbore for production to the surface. As a result, as the well matures, the amount of water produced and therefore present in the gas phase may increase significantly and at some point exceed the capacity of the packed column to reduce the water load and achieve the desired specification in the treated gas stream.

As will be understood by those of ordinary skill in the art, it is often not possible to reduce the flow of the gas stream into the packed column because of the continuous nature of the production and/or processing operations up and downstream from the packed column. The present invention addresses the problem of processing a gas stream in a separation unit where the load of the compound to be absorbed is variable and it is desired to maximize both the operating efficiency and the economics of the unit operation.

A further problem addressed is the reconfiguration or retrofitting of an existing separator unit operation that can no longer meet treated feed specifications due to changes in the incoming feed without incurring the major capital expenses associated with installing an entirely new separator unit in an existing larger complex unit operation.

SUMMARY OF THE INVENTION

The above problems encountered in the design and operation of packed columns of the prior art are overcome by the present invention in which a novel industrial packed column apparatus configured and dimensioned for the processing of a gas stream to remove a component by contact with a liquid absorbent includes:
   a. a plurality of tubular members having upper and lower ends aligned in a vertical parallel array to form a first bundle,
   b. each tubular member having a packed section positioned between its upper and lower ends, the packed section containing a packing material,
   c. each of the tubular members having a lean absorption liquid inlet positioned above the packed section and a rich absorption liquid outlet positioned below the packed section,
   d. each of the tubular members having a raw gas feed inlet positioned below the packed section and a treated gas outlet at the top of the tubular member above the packed section,
   e. each of the raw feed gas inlets connected to a raw feed gas manifold via control valves for selectively admitting the feed gas to one or more of the plurality of tubular members,
   f. each of the treated gas outlets being connected, respectively, via a valved conduit to (i) a treated gas collection manifold and (ii) the raw gas inlet of one or more of the other tubular members in the first bundle, and
      the apparatus being provided with appropriate monitors, sensors and controls so that all or a portion of a treated gas stream exiting a tubular member can optionally be passed for further treatment to at least one of the other tubular members in the first bundle.

In a preferred embodiment, the incoming lean liquid stream and the rich sorbent liquid containing absorbed water are connected by conduits to a manifold that is in fluid communication with an absorption liquid regeneration system. The regenerated liquid sorbent is recycled and reused in the apparatus in the form of the lean sorbent liquid feed to each of the packed tubular members that are put into operation. Similarly, the treated gas streams from which the water has been removed pass through gas outlets that are connected via conduits to a product manifold for recovery as the product meeting predetermined specifications.

In accordance with one important aspect of the present invention, the treated gas exiting a tubular member is monitored for moisture content, e.g., as by a moisture sensor or other analytic means, and treated gas that does not meet the product specification is transmitted via a valved conduit to a second tubular member where it is introduced with the untreated feed gas for further contact with the sorbent liquid. As will be understood by one of ordinary skill in the art, after the operating parameters of the apparatus of the invention have been determined and the moisture content of the feedstreams are known, the performance of the system can be predicted based upon experience and by using commercially available process engineering simulation software programs such as HYSYS and PRO/II.

For convenience, it is to be understood that the terms "sensor" or "sensors" as used in this description and the claims shall include probes and the like positioned in direct contact with the passing treated gas stream and generate a signal that can be correlated to the moisture present, electronic devices that form a part of the gas transmitting conduit, and other sampling devices that withdraw a sample of the gas and the undesired component for periodic or continuous testing. Many types of such "sensors" are well known to those of ordinary skill in the art, particularly for monitoring the amount of water present in a flowing fluid. It will also be understood by one of ordinary skill in the art from this disclosure that the present invention is not limited to the treatment of a gas stream to reduce the water load, but has broad utility and applicability from removing other undesired components that can be reversibly absorbed by a stable liquid that is compatible with the gas being treated.

In one preferred mode of operation, a bundle consisting of four tubular members identified, e.g., as A, B, C, and D, is operated as follows in order to provide extended treatment that may be required to meet the predetermined product specification. The gaseous feedstream is introduced to the bottom of column A and the treated stream passes from the top of column A into the raw gas inlet of adjacent column B and passes through the packed section of column B, thereby providing twice the length of contact with the packing material and sorbent liquid so that the treated gas stream leaving the top of column B is well within the specification. Similarly, gas containing water that is introduced to the bottom of column C is treated to remove some of the water, and gases from the top of column C are passed into the raw gas inlet in the bottom of column D where it is further treated to provide a product gas stream that is within the specification.

In a further mode of operation, where the passage of the feed gas through two consecutive packed tubular members produces a product gas stream that is significantly below the product specification, additional raw feed gas can be introduced into the bottom of the second column, e.g., columns B and D as described above, in order to produce a resultant mix of treated gases that is closer to the desired product gas specification. The determination of the appropriate mix of gases having passed through two packed columns with raw feed gas passing through only one of the columns is within the ordinary skill in the art. In the context of the GOSP examples, the water load of the gas stream associated with a GOSP can readily be determined upstream of the packed column apparatus of the invention. With this information and the known operating characteristics of the apparatus of the invention, a process engineering model of the system can be developed by one of ordinary skill in the art using computer software programs such as HYSYS or PRO/II to anticipate the treatment requirement of the raw gas stream. With the known water load of the incoming gas stream and the ability of each of the packed tubular members to remove a portion of that water, the distribution of the treated and raw gas streams among the tubular members can be calculated by the process simulation software program and appropriate data sent to control valves to adjust their respective flow rates and disposition of the treated and raw gas streams in the apparatus to maximize efficient operation and flow rates. This system, when used in conjunction with the apparatus described above provides an optimum method of operation for treatment of a given volume of gas containing a predetermined concentration or load of water to meet the treated gas specification.

In a preferred embodiment, historical data on the operation of the system is collected and maintained in the memory as a table of historical data which can be accessed by the operator and by the program in order to initially set the flow control valves for the incoming wet gas, and to make any adjustments during operation based on data transmitted from the system sensors.

In the event that further flexibility is required and/or the volume of gas to be treated is such that a bundle of four tubular members is insufficient to provide a product stream meeting the treated gas specification, one or more bundles can be added to increase the capacity of the overall assembly. As will be apparent to one of ordinary skill in the art, the number of tubular members linked via conduits and valves need not be limited to the four illustrated in the attached drawings.

In one aspect of the present invention, the economics of constructing the assembly of tubular members takes into account the favorable economies of using standard pipe lengths that are readily available from manufacturers/suppliers. The piping can be cut into any desired length, provided with appropriate openings for the introduction and removal of packing materials, the placement and welding of internal elements, the placement of ports, e.g., threaded inlets and outlets, sensors, gauges and other desired control elements. The pipes can be closed with end caps or plates, e.g., by welding, and the caps or plates are also fitted with appropriate inlet and outlet couplings for attachment of standard piping and valves. With these considerations in mind, it will be seen that a convenient arrangement is four tubular members which can be compactly positioned in touching alignment or with appropriate positioning spacers so that the four tubular members can be secured together to form a unit, should that be advantageous from the standpoint of providing a unit operation. The close positioning of the four tubular members also reduces the length of piping needed to link the units with communicating conduits for sequential passage of the treated gas stream from one to another.

Similarly, placement of multiple bundles, should they be required, in close proximity to each other, will also provide efficiencies in the delivery of the lean sorbent and recovery of the rich liquid sorbent, and also in the delivery of the raw feed gas and collection of the treated gas streams.

In yet another preferred embodiment which will be described in greater detail below, an existing packed column of the prior art, e.g., as described in conjunction with FIG. 1, which is unable to produce a product meeting specifications because of unanticipated loads in the raw feed gas is retrofitted by removing the packing section and all of the associated internal elements and installing a plurality of tubular members assembled into bundles and placed inside of the existing pressure vessel. This retrofitting with the requisite number of tubular members adapted for sequential passage of the treated stream through two or more of the small packed columns results in enhanced flexibility and the ability to recover a product stream that meets the specification.

BRIEF DESCRIPTION OF THE DRAWINGS

The invention will be described in further detail below and with reference to the attached drawings in which the same or similar elements are referred to by the same number, and where.

DETAILED DESCRIPTION OF THE INVENTION

Figure 3:
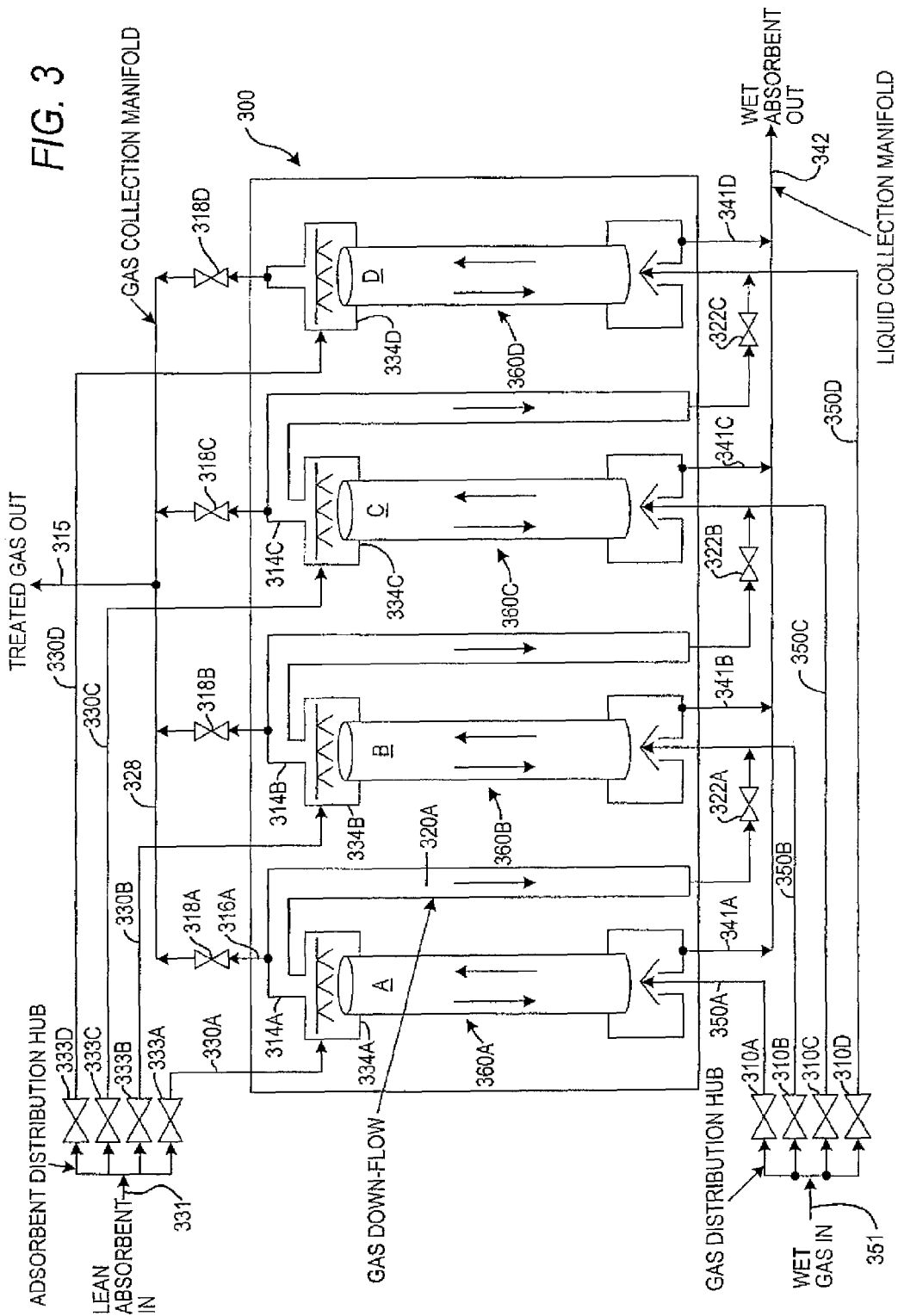
FIG. 3 is a schematic diagram of an embodiment of a packed column assembly of the present invention also having four tubular members with a first arrangement of liquid and gas conduits.

Referring now to FIG. 3, the apparatus and operation of one embodiment of a multi-leg assembly (300) will be described. The assembly (300) includes four separation columns, or legs, (360A, 360B, 360C, 360D) and the corresponding liquid absorption distribution and control system, wet absorbent collection and recovery system, wet gas distribution and control system, and treated gas collection system, each of which are described in detail below. The cylindrical columns can be conveniently fabricated from the lengths of standard commercially available pipe.

The wet gas (351) is admitted to a series of inlet control valves (310A, B, C, D) corresponding to the four legs of the assembly. The wet gas enters the first separation column (360A) via inlet line (350A) and rises through the column packing material to exchange moisture with the absorbent as described in further detail below.

The treated gas stream is discharged from the column via line (314A) and passes either through line (316A) and discharge control valve (318A) to be collected in the treated gas collection manifold (328). In the alternative, if it is determined that the treated gas discharged from the first column (360A) does not meet the required product specification, the discharge valve (318A) remains closed and transfer valve (322A) is opened to admit the partially treated gas from line 320A into the adjacent column (360B). In this case, the partially treated gas stream can either be mixed with fresh wet gas entering through inlet valve (310B) via inlet line (350B), or inlet valve (310B) can be maintained in a closed position and the transferred gas will pass through the second column (360B) as the sole stream for further treatment. If the twice-treated gas stream meets or exceeds the required product specification, it exits via discharge line (314B) and gas discharge valve (318B) to enter the treated gas collection manifold (328). Columns 360B and 360C are provided with similar transfer lines and sensor controlled valves, including lines 314B and 314C that function similarly to line 314A. Each of the treated gas outlets being respectively connected via a valved conduit to (i) a treated gas collection manifold and, with the exception of the final downstream member, (ii) the raw gas inlet of one or more of the other tubular members in the first bundle.

In the event that the treated gas exiting the second column (360B) exceeds the required product stream by a relatively wide margin, it can be mixed with some or all of the partially treated gas stream that passes through the third and, optionally, fourth columns (360C, 360D) in order to provide a blended treated gas stream exiting the separation and discharge conduit (315) that meets the treated gas specification.

As will be understood by one of ordinary skill in the art, the overall system for determining the path of the wet gas through one or multiple columns can be determined by (a) the use of appropriate inline sensors which can test for the presence of water vapor, and/or (b) experience with the operational characteristics of the unit and the waterload of the incoming wet gas stream (351) and supported by use of appropriate process engineering simulation software programs such as HYSYS and PRO/II. The output of the sensors can be provided in the form of data to an appropriately programmed processor/controller that is linked to the various gas flow control valves (310A-310D; 318A-318D; 322A-322C). In the interests of clarity and for the purpose of describing the principal novel features of the multi-leg separation column assemblies of the invention, the sensors and related processor/controllers of the prior art are not shown in the drawings.

The absorbent liquid distribution system receives the fresh and/or recycled lean absorbent liquid (331) in the absorbent distribution hub which, in the embodiment illustrated, include four absorbent inlet control valves (333A-333D) which, respectively, admit the absorbent liquid via lines 330A-330D to one or more of the separation tubes (360A-360D). The fresh incoming liquid is distributed via, e.g., a system of spray nozzles (334A-334D) uniformly over the upper portion of the packing material in the tube for counter-current contact with the rising wet gas. The wet absorbent is collected at the bottom of each column and passes through a discharge conduit (341A-341D) and is recovered in wet absorbent manifold (342) for transfer to a conventional regeneration unit (not shown) for removal of the adsorbed water and transfer of the regenerated liquid absorbent to a storage vessel.

As will be understood from the description above of the wet gas circulation and control system, if one or more of the columns (360A-360D) are not put into service or if the treatment of the wet gas can be reduced in order to meet the predetermined product gas standard, the flow of fresh absorbent liquid can be controlled via one or more of the absorbent inlet valves (333A-333D).

Figure 1:
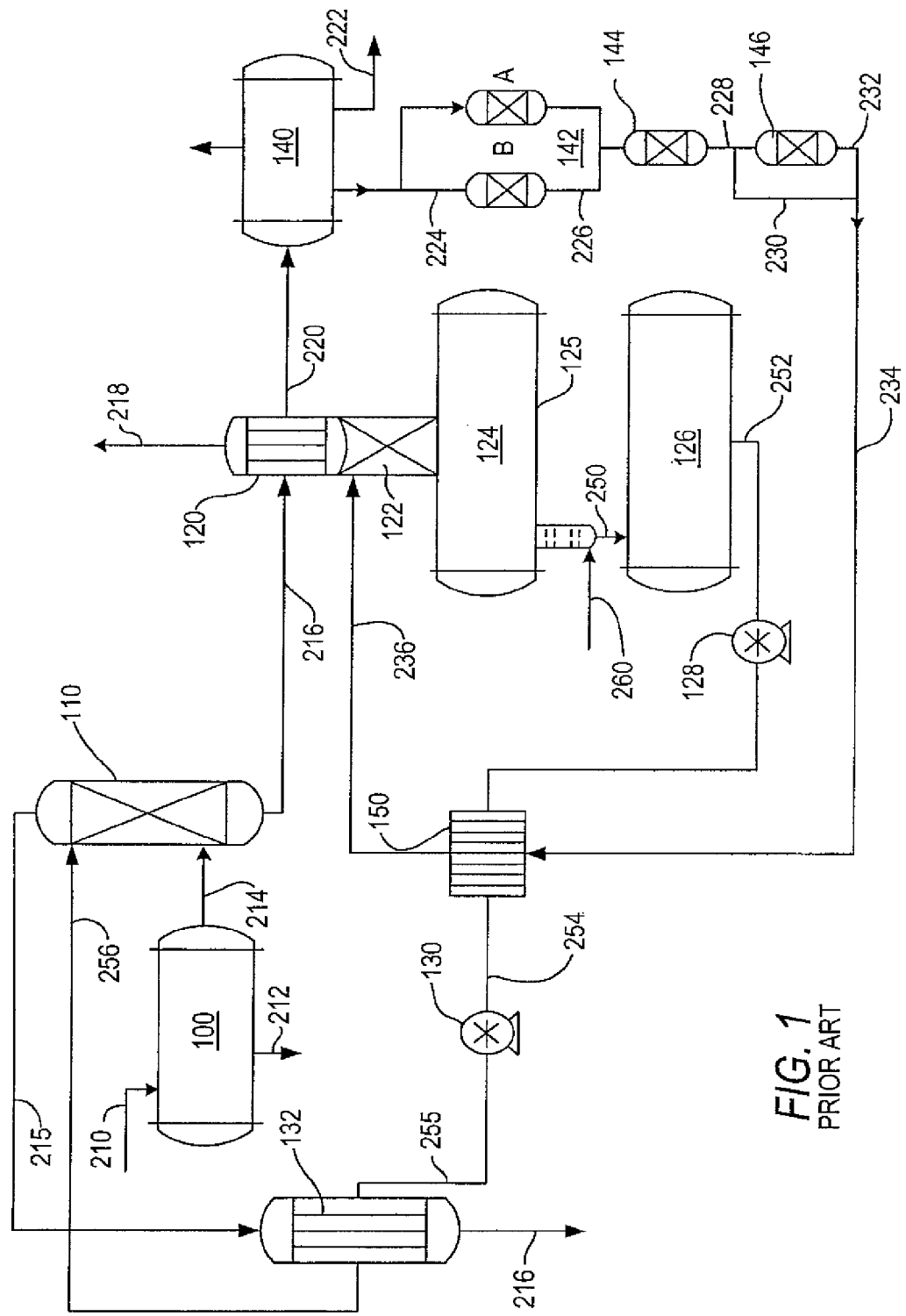
FIG. 1 is a schematic illustration of a typical GOSP dehydration unit of the prior art.
Figure 2:
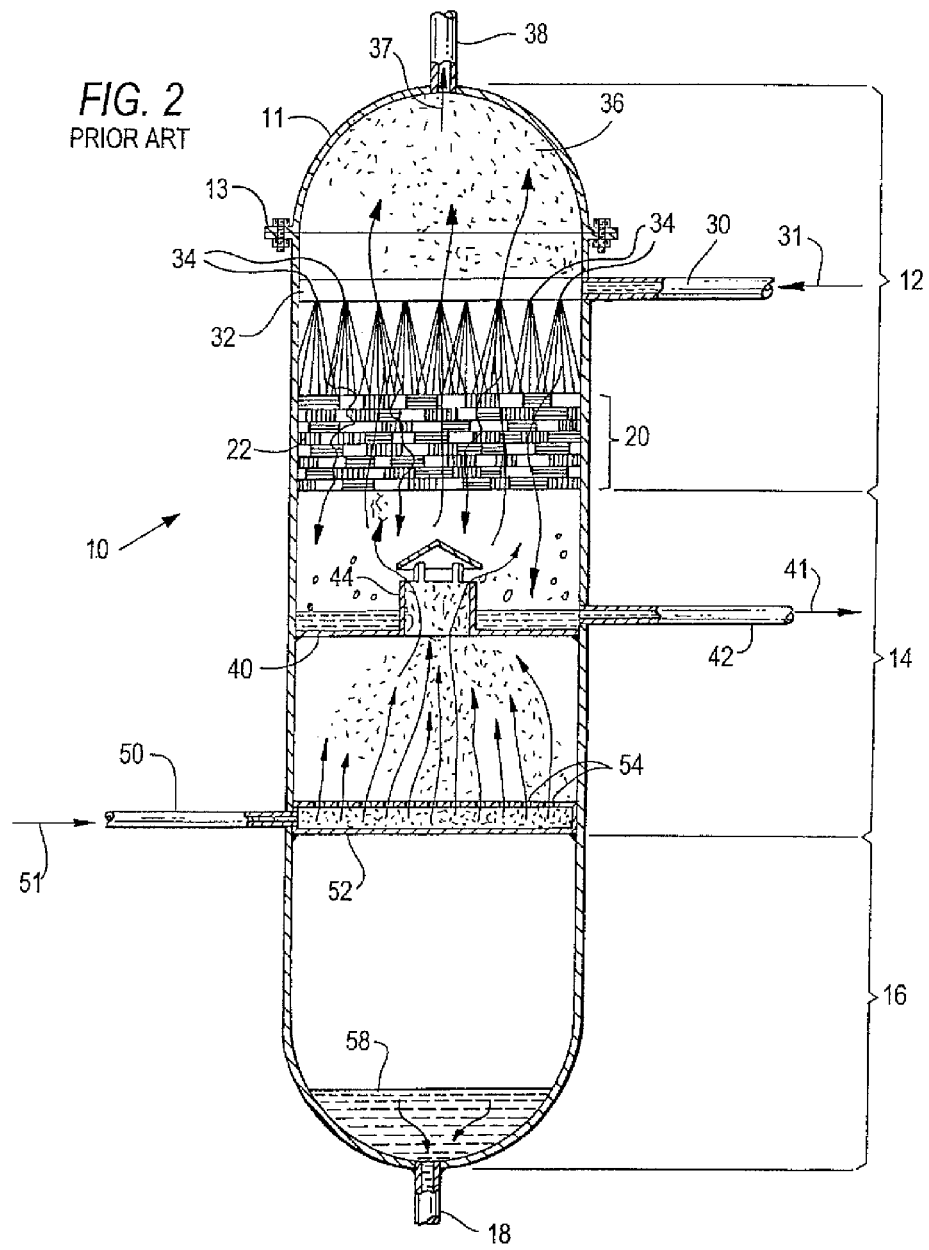
FIG. 2 is a schematic illustration of a representative packed separation of the prior art.

It will also be understood from the description of the prior art systems in connection with FIGS. 1 and 2 above that the diagram of FIG. 3 is simplified in order to provide a clear and concise understanding of the essential features of the present invention. It will also be understood that the number of tubes forming an assembly (300) can be optimized to have more or less than the four tubes illustrated in FIG. 3 and described above. In principal, the assembly containing more or less tubes will include the same or very similar conduits, control valves, sensors and programmed processor-controllers.

Figure 4:
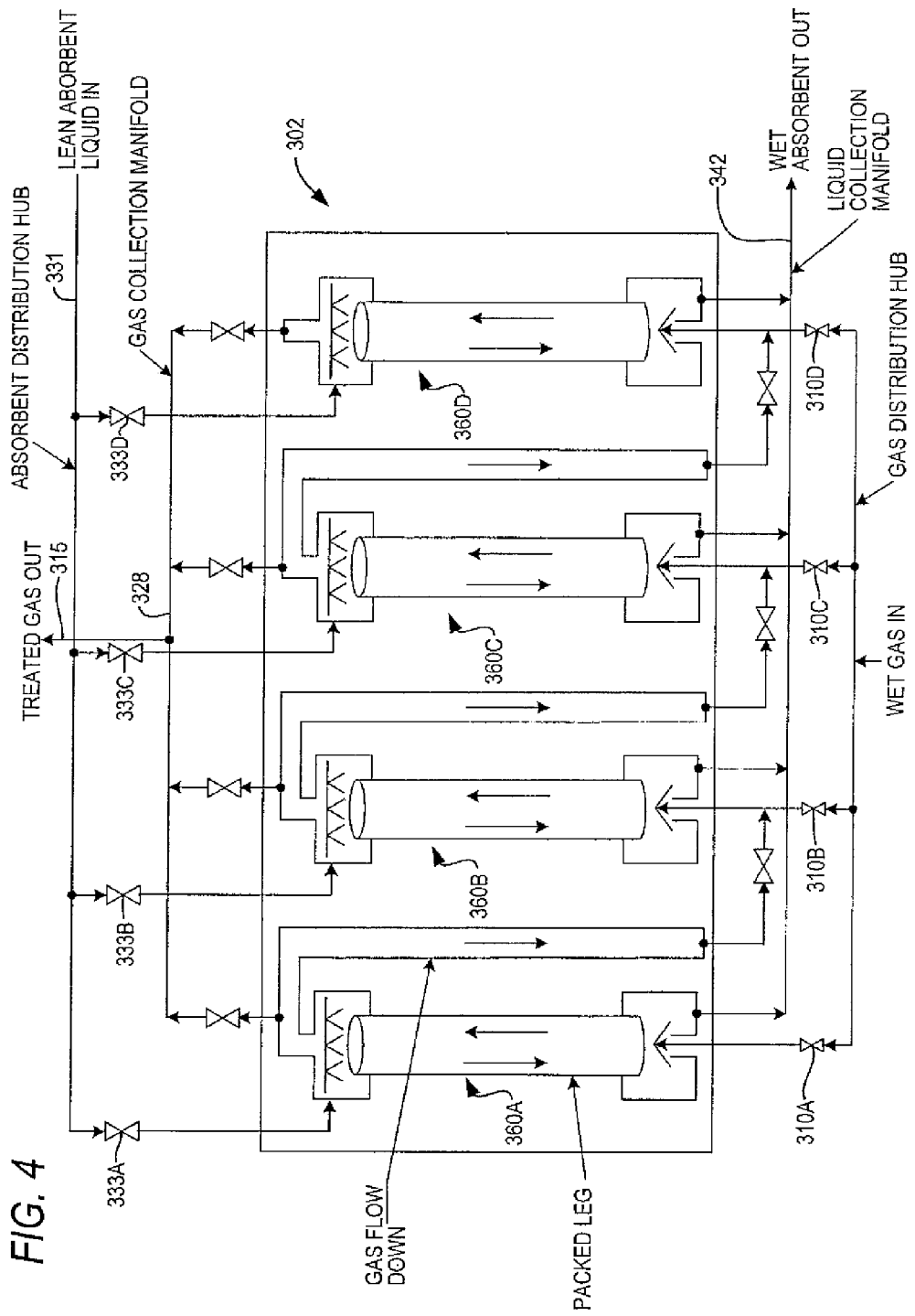
FIG. 4 is a schematic diagram of a packed column assembly of the present invention also having four tubular members, and with an alternate arrangement of liquid and gas conduits.

Referring now to FIG. 4, a second embodiment of the system of the invention will be described. The assembly (302) also includes four separation tubes or columns (360A-360D) that are preferably arranged in a compact configuration in order to minimize the length of the pipe runs and energy requirements for transmission of the wet gas and the absorbent liquid. In this configuration, it will be noted that the liquid inlet control valves (333A-333D) of the wet gas inlet valves (310A-310C) are located in closer proximity to the respective separation tubes.

The system of FIG. 4 can be operated using the same methods and processor/controller described above in connection with the system of FIG. 3. Other arrangements for a gas and liquid absorbent feeds, control valves, and physical arrangement of the separation columns will be apparent to those of ordinary skill in the art. The number of tubes and their configuration can be based upon previous experience and physical space considerations, as well as the desire to retrofit larger fixed separation columns with smaller, more flexible assemblies that will permit the operator to achieve the required product specifications with varying waterloads and product flow rates. Commercially available software can also be employed to provide alternative piping and valve configurations to best accommodate a particular installation.

Case Study

A working gas-oil separation plant (GOSP) included a gas dehydration unit that was designed with a theoretical capacity for dehydrating 511.2 MMSCFD (million standard cubic feet per day) gas to a maximum water load of 7 pounds of water per MMSCF of wet gas by a physical absorption process using triethylene glycol (TEG) in a packed column contactor. The water-rich TEG was regenerated and continuously recycled back for reuse in the system. The full process description and the flow scheme of the GOSP gas dehydration unit of the invention is summarized in FIGS. 1 and 7A and 7B below.

Subsequent to the commissioning and the initial satisfactory operation of the TEG dehydration unit to meet treated gas stream specifications, it was found that the separator was no longer able to dehydrate the wet gas to the required specification at the design gas flowrate. This was due to the significant departure from the contemplated design operating conditions. As shown by the design basis versus actual operating parameters in Table 2, the load of the wet gas feed to the TEG contactor was much higher than the design load.

TABLE 2

Design Basis Process Parameters vs. Current Operating Parameters

| Parameter | Design Basis Conditions | Current Operating Conditions |
|---|---|---|
| Contactor Inlet Gas Rate | 511 (MMSCFD) | 250 (MMSCFD) |
| Temperature | 121 (° F.) | 145 (° F.) |
| Pressure | 385 (psig) | 300 (psig) |
| Contactor inlet gas water load | 236 (lb water/MMSCF) | 503 (lb water/MMSCF) |

The water loading in the overhead gas emerging from the TEG contactor as determined by HYSYS process simulation was 31.4 lb/MMSCF in summer which is significantly more than the design specification of 7 lb/MMSCF.

Based on the difference between the design-based conditions and the actual operating conditions of the TEG contactor as shown in Table 2, the water loading of the wet gas entering the contactor was 113% greater than the original maximum design capacity. This increase in water loading was the result of a thermodynamic shift in the gas water saturation equilibrium point due to the combined effect of an increase in temperature and a decrease in pressure of the feedstream. With these changes in the operating parameters of the wet feed gas, the actual water load of the dry gas leaving the contactor was found from laboratory analysis to be 27.2 lb/MMSCF. The operating temperature and pressure are different from the original design conditions due to changes in upstream producing well parameters that were not accurately predicted in the original petroleum engineering forecast This result was also confirmed by a HYSYS computer simulation which gave a value of 31.4 lb/MMSCF, indicating that the then-current operating conditions would indeed result in a significantly off-spec treated gas stream issuing from the contactor.

The packed column method and apparatus of the present invention that included a plurality of interconnected tubular packed columns was retrofitted into the GOSP gas dehydration unit operation to enable the dehydration system to achieve the 7 lb/MMSCF dry gas specification with the actual operating conditions that are described above. The improved contactor of the invention also has the additional advantage of providing sufficient flexibility to accommodate any reasonably foreseeable future changes in operating parameters. The contactor of the invention can also serve as a back-up unit to both new and existing contactors.

The improved results are achieved by applying the following principle to the GOSP gas dehydration contactor:

1. Reducing the cross-sectional area of the packed section of the contactor to less than half of the original design area provides more efficient contact between the wet gas and the liquid absorbent in the packed sections, and also provides fluid communication between the tubular members so that the wet gas can have two or more flow passes through successive packed sections. This result is achieved by the gas flow rate being reduced by more than 50%, e.g., from 511 MMSCFD to 250 MMSCFD, and by utilizing a packing material that operates with a higher gas flow rate and a relatively lower pressure drop. Although, the existing packing material can be used to achieve the objective of reducing the column cross-sectional area by half, the second objective of increased transfer units will not be met. Therefore, the high capacity packing material was selected to optimize the use of the limited space available to enable more flow passes and an increase in transfer units 2. Increasing the equivalent height of the packed section to at least double the theoretical number of transfer units (NTU's) of the existing packed column section. This height increase is based on the changed parameter of the wet gas where the water loading of the wet gas entering the contactor has increased by 113%, i.e., from 236 to 503 lb water/MMSCF.

The following describes an embodiment in which the apparatus configured in accordance with the invention is employed to retrofit a single existing packed column to upgrade and enhance its performance capabilities in processing a wet gas stream ancillary to a GOSP. This retrofitting is schematically illustrated in a simplified form in FIGS. 7A and 7B, to which further reference will be made below. In the schematic illustrations, the assemblies are represented as circles for convenience and clarity; however, it will be understood that each of the assemblies comprise a plurality of tubes, e.g., four, three, etc.

The following packed section dimensions were utilized in the calculation of the required cross-sectional area using existing packing material:

Inside Diameter (ID)=11'-1.86" (3400 mm)

Height=16'-4.54" (4992 mm)

Design Diameter (D)=134 inches, Area=$\pi*D^2/4$=14,104 $in^2$

New Cross-Sectional Area Required=14,104/2=7,052 $in^2$ (ID of 95")

The diameter of the existing gas outlet nozzle positioned vertically on top of the column was 32" and permitted a pipe having an ID of 28" and 16 feet long to pass vertically through the nozzle and be positioned on top of the grating at the bottom of the packed section of the column. The cross-sectional area of each of the 28 inch diameter pipes is about 600 $in^2$, and twelve of the 28" diameter pipes provide a total cross-sectional area of 7200 $in^2$. This area will meet the requirement, assuming the existing packing material will be utilized. However, this will not meet the second objective of achieving the contact equivalent of doubling the theoretical Number of Transfer Units (NTU's) of the existing packed column section.

In order to meet the operating specification of 7 lbs. of water/MMSCF, it was necessary to increase the contact height equivalent by more than double the Number of Transfer Units (NTU's) of the original packed column section. This objective could only be achieved within the limited space of the retrofitted column by two to three passes through the individual packed sections of the plurality of tubular members. To create more space, a high-capacity packing material was selected for each of the 28"×16' tubular members.

The selection of the packing material was based upon a review of data in commercial literature of the type customarily provided by the manufacturer. A vendor typically develops comparative test data using one or more specific commercial packing materials produced by the vendor and one or more products purchased from competitors. Representative vertical counter-current tests in an absorption tower or column are conducted with common separation systems. For example, a system for cleaning a flue gas is demonstrated by scrubbing a gas stream with a $NaHCO_3$ buffered caustic solution to remove $SO_2$ in a column that is sequentially filed with the competing packing materials. It is generally accepted in the field that the results of such comparative tests are useful in determining the relative effectiveness of the various types of packing materials under comparable conditions, even if the compounds to be absorbed and the absorbent materials are not identical to the process for which the packing is to be used.

As is also customary in the trade, once the characteristics of the fluid systems and the range of operating conditions have been more precisely determined, the packing manufacturer will, on request, provide the specific superficial gas velocity and liquid loading factor data.

In the present Case Study, the values used in the preliminary calculations were based upon data obtained from commercial literature distributed by Lantec Products Inc. of Agoura Hills, Calif. 91301. Based on this data, the packing sold under the trade name Q-PAC® was selected for use in the Case Study.

Figure 5:
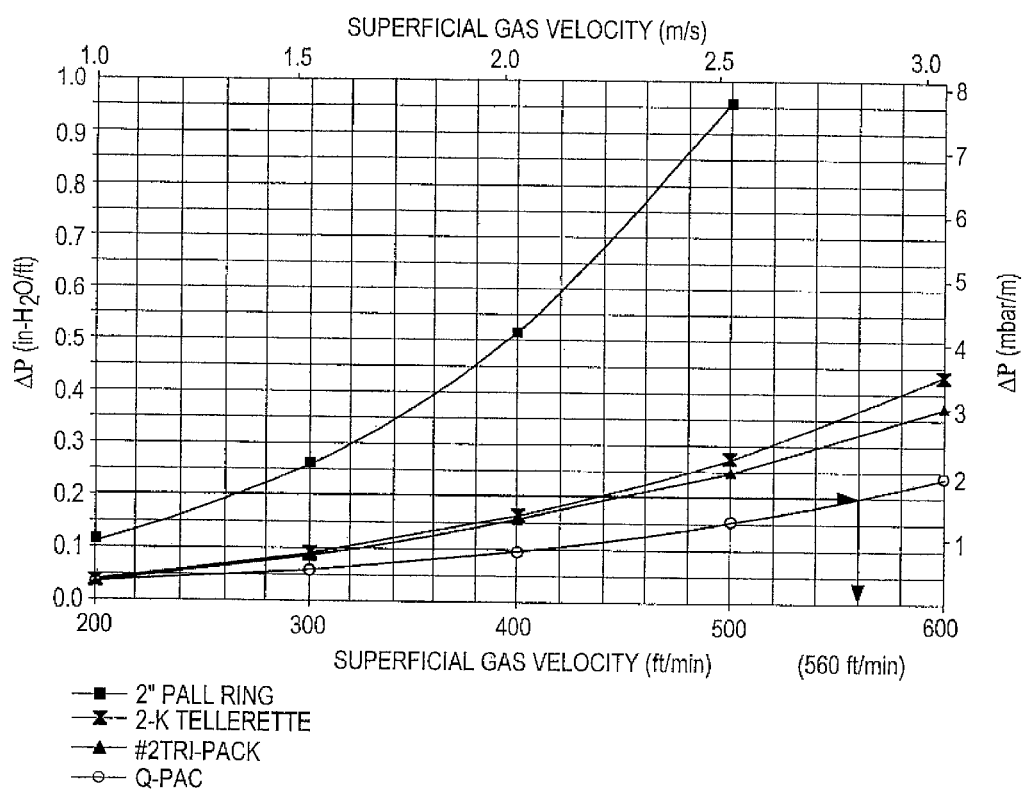
FIG. 5 is a replica of a product supplier's chart depicting pressure drop versus gas velocity for various specified packing materials.

Reference will be made to FIG. 5 which is based on the Q-PAC® solid packing material product brochure. As shown by the comparative plots of pressure drop vs. superficial gas velocity for three other types of commercial packing materials, the Q-PAC® packing material achieves a more efficient mass transfer with a relatively lower pressure drop. As a result, the cross-sectional area required for each section is less than the calculated 7,200 $in^2$ provided by the twelve 28"×16' pipes. The required cross-sectional area using the Q-PAC® packing is obtained from the pressure drop versus superficial velocity chart. The configuration of the vertical counter-current absorption tower corresponding to the data in FIG. 5 in an air/water system at 70° F. (21° C.) and 14.7 psia (1013 mbar) is as follows: column cross-section: 6 $ft^2$ (0.56 $m^2$); packing height: 3 ft (914 mm); and liquid loading: 10 gpm/$ft^2$.

For an acceptable and very low pressure drop of 0.2 in-$H_2O$/ft, the corresponding superficial gas velocity was determined from the plot of FIG. 5 to be 560 ft/min. The following gas parameters were obtained from the process simulation results by the HYSYS computer simulation:

Gas Mass Flow Rate=574,900 lb/hr=574,900/3600=160 lb/sec

Gas Mass Density at flowing condition=1.071 $lb/ft^3$

The required cross-sectional area using the Q-PAC® packing material is calculated as follows:

The Gas Actual Volumetric Flow rate=160/1.071=149 $ft^3/s$

The Gas Superficial Velocity=560 ft/min=560/60=9.3 ft/s

The required gas cross-sectional area in the packed section=149/9.3==16 $ft^2$=2304 $in^2$ The number of 28" diameter pipes (each approximately 600 $in^2$ cross-section) packed with the Q-PAC® packing material is =2304/600=3.84, or a total of four tubular members containing the Q-PAC® pack material.

A total of twelve 28" diameter tubular members were packed with Q-PAC® solid packing material and arranged into 3 bundles, each consisting of 4 pipes and positioned in the existing contactor. Each of the tubular members was provided with inlet and outlet conduits and a system of valves, e.g., as shown in FIG. 3 to permit the treated gas stream from one tube to be directed to the raw gas inlet of another packed tubular member to provide a longer contact time with the liquid absorbent in order to remove more water and thereby achieve the required dry gas specification.

The relative paths of the wet gas and TEG streams were counter-current flow in all three of the bundles, and the required cross-sectional flow area was met.

Lean TEG Circulation Rate Determination

Figure 6:
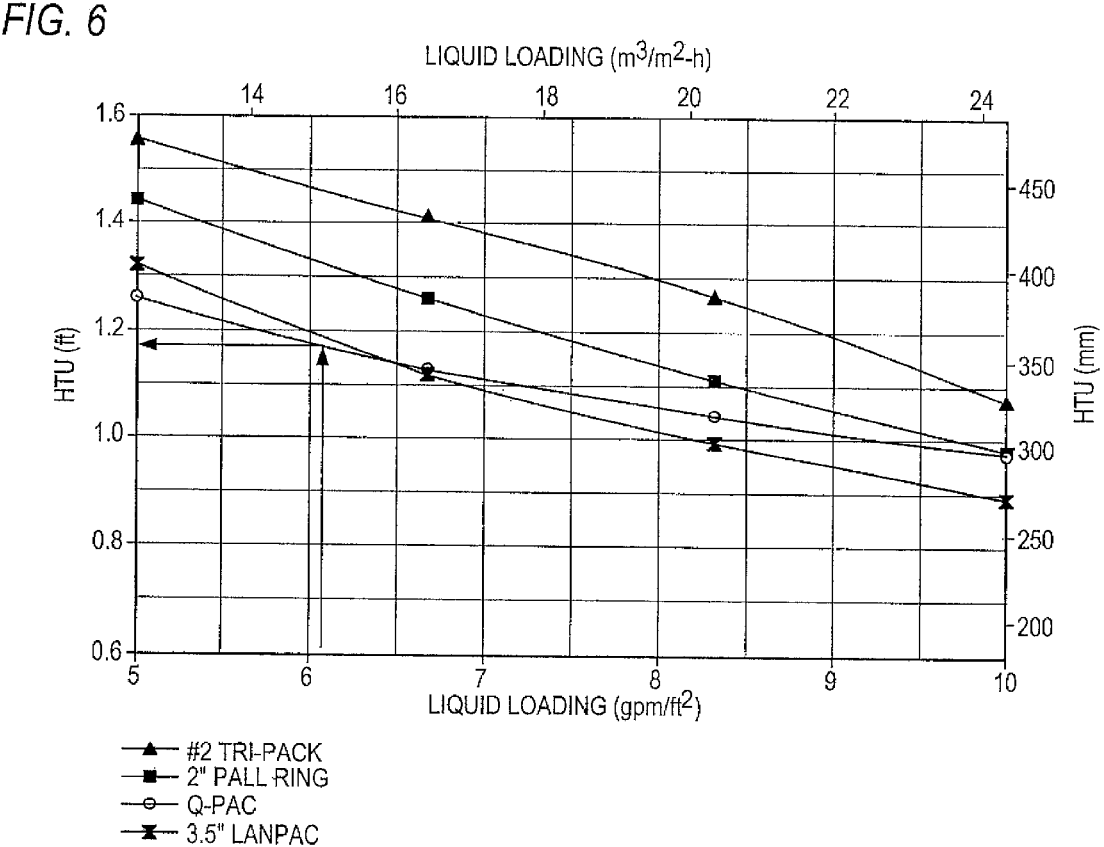
FIG. 6 is a replica of a product supplier's chart that plots Height of Transfer Units (HTU) versus liquid loading for various specified packing materials.

Referring now to FIG. 6, use will be described of the chart provided by the Q-PAC® product manufacturer that is the plot of liquid loading versus HTU to determine the Height of Transfer Unit (HTU) for the lean TEG circulation rate. The configuration of the vertical counter-current absorption tower corresponding to the data in FIG. 6 is as follows: column cross-section: 6 $ft^2$ (0.56 $m^2$); packing height: 3 ft (914 mm); a superficial gas velocity of 400 ft/min (2.0 m/s); and scrubbing $SO_2$ with a 2% $NaHCO_3$ buffered caustic solution at a pH of 9.0. As previously noted, this system differs from that of the Case Study for water removal, but the data serves for a preliminary analysis of the operational characteristics.

As discussed above, the calculated required gas cross-sectional area in the packed section of 149/9.3=16 $ft^2$ resulted in a lean TEG circulation rate of about 98 USgpm. The liquid loading is =98/16=6.125 gpm/$ft^2$. The Height of Transfer Unit (HTU) is then obtained from the chart reproduced in FIG. 6 as =1.17 ft. The required number of transfer stages equals the total height of packed section/HTU=16.378/1.17=14. Process simulation by the HYSYS computer simulator indicates that this is adequate to achieve the required specification.

Although the new arrangement consists of 3 bundles, each bundle consisting of 4 tubular members of 28"NB×16.38' packed with Q-PAC® material, only one bundle is required in order to achieve the separation objective for the current operating conditions. However, the column will have the flexibility of utilizing one or more of the other bundles for separation or for future upgrades to achieve a greater mass transfer.

Figure 7A:
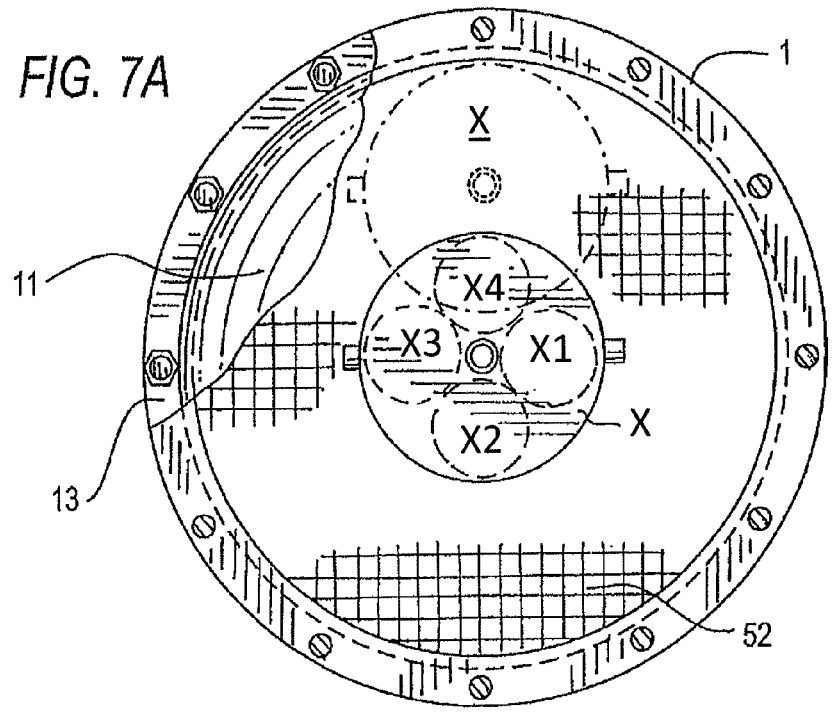
FIGS. 7A and 7B are schematic illustrations of an embodiment in which an existing column is retrofitted with three packed column assemblies in accordance with the invention.
Figure 7B:
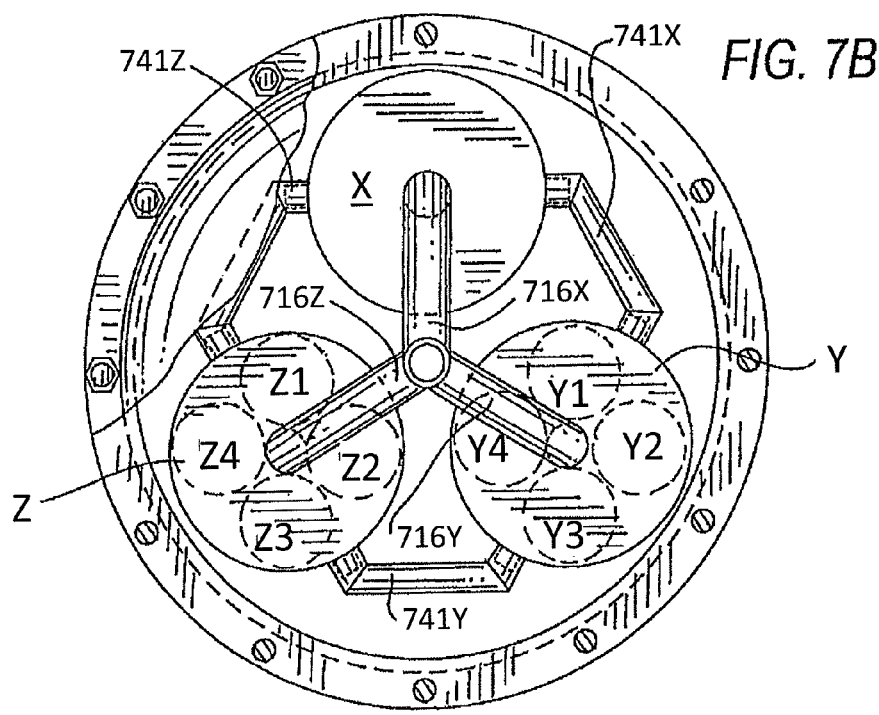

This arrangement for retro-fitting a large separation column of conventional design with three assemblies is schematically illustrated and its method of construction will be described with reference to FIGS. 2 and 7A and 7B, in which the top portion (11) of the separator column (1) is removed at the manhole to provide access to the interior of the vessel by removal of the bolts securing the flanged portions (13). A first bundled assembly X of four (4) tubes (X1, X2, X3, X4) is assembled in-situ in the column after lowering its component parts into place via the open end of the column (1) and supported on an interior grate corresponding to the plate (52). The assembly X is repositioned laterally within the interior of (1) the larger vessel in order to permit a second assembly Y of four tubes (Y1, Y2, Y3, Y4) to be assembled in-situ in the column when its components have been also lowered into the receiving vessel and repositioned to permit a third assembly Z of four tubes (Z1, Z2, Z3, Z4) to be coupled in place on the supporting plate (52) in a similar manner. The arrangement of the four tubes positioned inside of, and comprising the respective assembly Y and assembly Z can be the same as assembly X. Alternatively, assembly Y and/or assembly Z can be provided with a different number of interconnect tubes and control valves based upon the prevailing local conditions and treated wet gas specification. Manifolds (716X-716Z) from the to of each assembly are schematically illustrated, for example, joined to a central collection position. Conduits (741X-741Z) at the bottom of the assemblies X-Z are used to remove the wet absorbent produced.

Figure 8A:
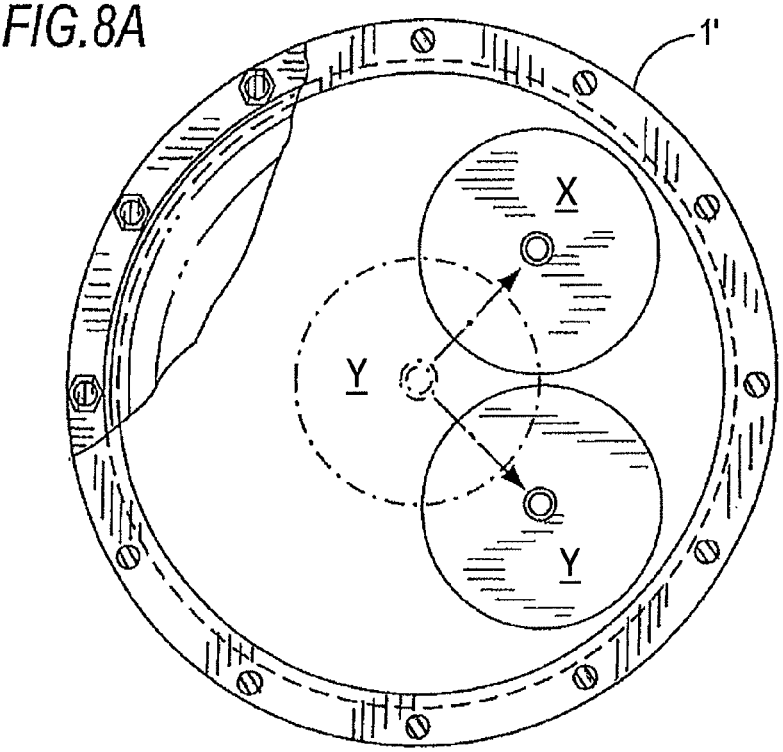
FIGS. 8A and 8B are schematic illustrations of another embodiment in which an existing column is retrofitted with four packed column assemblies in accordance with the invention.
Figure 8B:
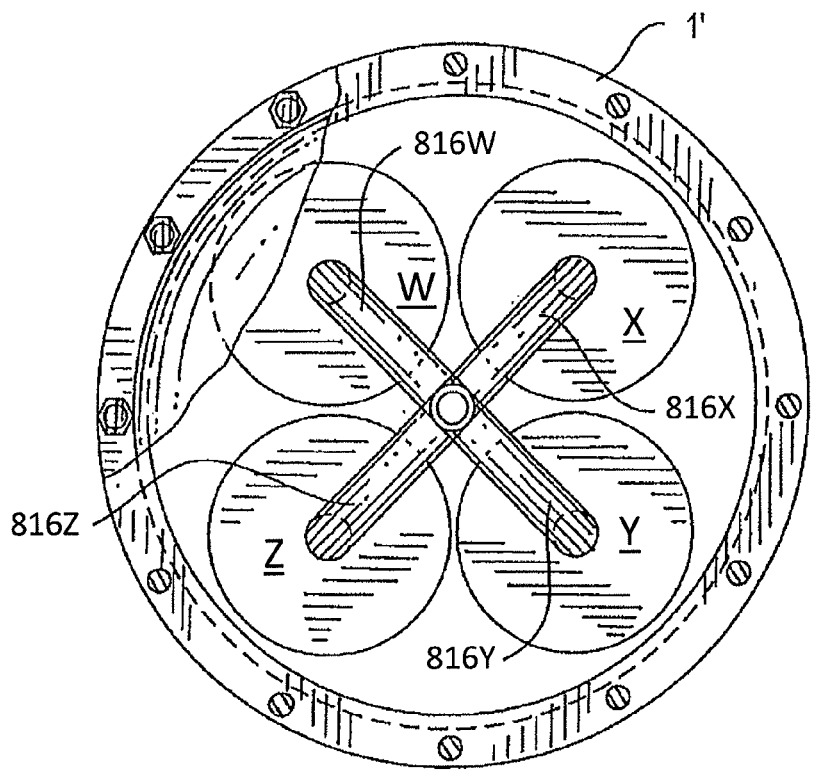

Referring to the schematic illustration of FIGS. 8A and 8B a further embodiment is shown in which components of four assemblies W, X, Y, Z are each lowered sequentially into the larger cylindrical vessel (1') and then each is moved radially away from the central axis to permit components of subsequent assemblies to be lowered onto the supporting surface and similarly relocated to a position displaced from the central axis. In a preferred embodiment, the four assemblies are each constructed from four tubes or pipes, thereby providing a total of sixteen separation pathways. Manifolds (816W-816Z) from the top of each assembly are schematically illustrated, for example, joined to a central collection position.

The connections to the various manifolds as described above are then completed in accordance with a pipe layout scheme that has been predetermined in accordance with the performance requirements and characteristics of the feed and product specifications.

Other assemblies containing three interconnected tubes with appropriate valves and controls can be used to meet specific requirements associated with physical space limitations, feed stream compositions, treated product specifications, and other variables and parameters that will be apparent to those skilled in the art.

Figure 9:
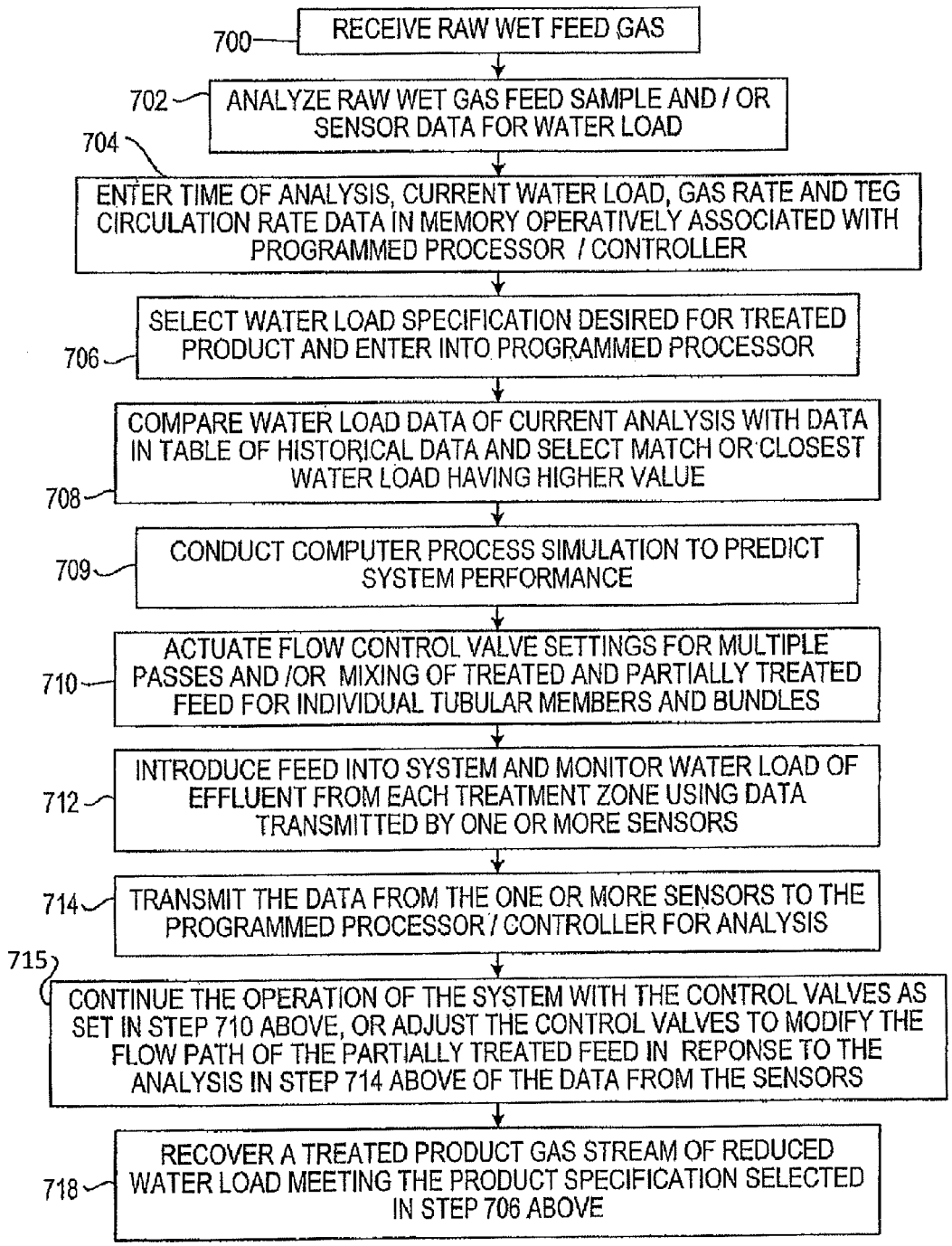
FIG. 9 is a flow chart depicting an embodiment of an automated process for practicing a method in accordance with the invention.

Referring to the process flow diagram of FIG. 9, the system of the invention initially receives the raw wet feed gas (700) from a pipeline or an upstream treatment step. An analysis is made (702) either by physically withdrawing a representative sample of the wet gas from the pipeline or by collecting data from a sensor that is positioned within the wet gas feedstream from which the water load value can be determined.

The results of the analysis (702) and the time of the sampling or collecting of the data on the water load are entered (704) in the memory of an appropriately programmed processor/controller of a dedicated or a general purpose computer. For convenience, the initial data on the water load will be referred to as the "current" data.

Simultaneously, or in accordance with a standing protocol (706), the water load specification is selected and represents the standard required for the treated product discharged from the system of the invention. The water load data from the current analysis is then compared with data which is preferably stored in tabular form in the processor (708) which reflects a tabulation of historical data based upon experience with the operating system of the invention. The processor looks for an exact match of the incoming water load with the data in the table for selection, or it selects the closest incoming water load having a higher value. These steps and the selection process ensure that the desired lower water load specification of the treated wet gas stream will be met by the system and method of the invention, since it has been previously determined that an initial water load, or an even higher water load in the incoming wet gas feed has been successfully treated to meet the desired specification or standard for the treated gas stream.

The data selected is then subjected to computer simulation (709), e.g., using HYSYS or PRO/II, to predict the performance of the system under the conditions selected and prevailing. If any anomalies are noted, they are addressed by technical personnel. Once the simulation indicates that the system can meet the desired specification, the operational steps are initiated.

In the next step (710), the processor/controller actuates the initial flow control valve settings based upon the data obtained above (708). Suitable programs for valve control systems for transmitting signals to process control valve actuators are well known in the art, and permit valve adjustments for a range of partially open as well as fully opened or closed positions. For a wet gas feed having a relatively high water load, the flow control valves will provide for passage of the wet gas through a plurality of tubes in the treatment assemblies.

The feed is then introduced into the system (712) and the water load of the effluent wet gas from each treatment zone is monitored using one or more sensors to collect the information and generate a continuous or an intermittent stream of data to the processor/controller. This data can be compared with performance characteristic data stored in the associated memory for each assembly and/or treatment zone that is based upon past experience with the system and/or the pre-programmed performance data provided by the supplier (714).

Based upon the comparison of the data provided by the sensors at various steps in the process (715), the system can continue to operate with the control valves as originally set (714), or the processor/controller can make necessary adjustments to the flow control valves to modify the volume and/or flow path of the partially treated wet feed gas in response to the data received (714). The flow control valves are also adjusted, as appropriate, to mix partially treated feed from one assembly with feed which has exceeded the established specification for water load reduction in order to provide a final mixture which is within the range of the desired water load specification for the gas of reduced water content leaving the system for further downstream processing.

In accordance with the method and system of the invention, the gas stream recovered (718) following treatment by the method and system of the invention meets the required product specification.

The prior art solution to the problem has been limited to the ability of the operator to find a potentially more efficient structure packing material and arrangement that will enhance mass and heat transfer in the packed section to deal with the increased water load of the wet gas stream that must be treated. The present invention provides a packed column with multiple packed sections that can be operated to pass the wet gas sequentially through two or more packed sections for contact with fresh lean liquid sorbent. The method and apparatus of the invention solves the problem of providing operating flexibility and efficiency over a wide range of conditions and has the capability to maximize turndown.

The invention can be utilized for varying production capacities and to meet varying feed and treated product specifications. It provides the flexibility of using one unit operation for the entire life of an oil and/or gas field even where there is a potentially large uncertainty in the production forecast data, thereby avoiding the cost of modification and/or replacement of under-performing units.

The present invention also solves the problem of responding to any major changes in gas flow rate and/or change in the feed composition or operating conditions in the column without adversely affecting the performance by providing a packed column that can continue operating efficiently over a wide range of gas flow rates and water/gas compositions.

Although various configurations have been illustrated and examples provided, further modifications of the system and method will be apparent to those of skill in the art from this description and the protection and scope of the invention is to be determined by the claims that follow.

The invention claimed is:

1. An industrial packed column apparatus configured and dimensioned for processing a raw gas feedstream to a gas-oil separation plant comprising a gaseous hydrocarbon stream containing water to remove at least a portion of the water by contact with a liquid absorbent selected from the group consisting of triethylene glycol (TEG), ethylene glycol, methyl ethylene glycol and methyldiethanolamine, the apparatus comprising:
   a. a plurality of tubular members having upper and lower ends, the tubular member being aligned in a vertical parallel array to form a first bundle, one of the tubular members being configured as the final downstream member,
   b. each tubular member having a packed section positioned between its upper and lower ends, the packed section containing a packing material,
   c. each of the tubular members having a lean absorption liquid inlet positioned above the packed section and a rich absorption liquid outlet positioned below the packed section,
   d. each of the tubular members having a raw gas feed inlet positioned below the packed section and a treated gas outlet at the top of the tubular member above the packed section,
   e. each of the raw feed gas inlets connected to a raw feed gas manifold via control valves for selectively admitting the raw feed gas to one or more of the plurality of tubular members,
   f. each of the treated gas outlets being respectively connected via a valved conduit to (i) a treated gas collection manifold and, with the exception of the final downstream member (ii) the raw gas inlet of one or more of the other tubular members in the first bundle, except the treated gas outlet of the final downstream member in the bundle, whereby all or a portion of a treated gas stream exiting a tubular member, except for the final downstream member can be passed for further treatment to at least one of the other tubular members in the first bundle.

2. The apparatus of claim 1 in which the first bundle consists of at least three tubular members.

3. The apparatus of claim 1 in which each of the lean absorption liquid inlets are in fluid communication with a lean absorption liquid manifold, and each of the rich absorption liquid outlets are connected via valved conduits to a manifold that is in fluid communication with an absorption liquid regeneration system.

4. The apparatus of claim 1 in which the plurality of packed tubular members are contained in a close-fitting array in a pre-existing packed column vessel from which the packing material and internal structure has been removed to provide a retrofitted industrial packed column.

5. The apparatus of claim 1 in which each of the control valves is a flow control valve that is actuated by a signal that corresponds to a condition detected by one or more sensors that monitor a component load in the effluent in the treated gas or a rich absorbent liquid, or both the treated gas and rich absorbent liquid.

6. The apparatus of claim 5 that further comprises a programmed processor controller with associated memory operatively coupled to one or more component sensors and to the flow control valves.

7. An industrial packed column apparatus comprising at least two bundles constructed in accordance with claim 1, the treated gas manifold of the first bundle being in fluid communication via at least one control valve to the raw feed gas manifold of at least one other bundles.

8. The apparatus of claim 7 comprising three bundles, where each bundle contains four tubular members.

9. The apparatus of claim 7 in which the control valves are flow control valves and the flow control valves are adapted and configured to pass the treated gas from one of the tubular members in a bundle to at least one of the other tubular members in the same bundle in response to a signal transmitted by a processor controller.

* * * * *